US011843199B2

(12) United States Patent
Kung et al.

(10) Patent No.: US 11,843,199 B2
(45) Date of Patent: Dec. 12, 2023

(54) CARD CONNECTOR HAVING TWO SLIDING MEMBERS

(71) Applicants: JINN SHYANG PRECISION INDUSTRIAL CO., LTD., New Taipei (TW); Chiun Hui Technology Co., Ltd., New Taipei (TW)

(72) Inventors: Shu-Chu Kung, New Taipei (TW); Ching-Chia Chu, New Taipei (TW)

(73) Assignees: JINN SHYANG PRECISION INDUSTRIAL CO., LTD., New Taipei (TW); CHIUN HUI TECHNOLOGY CO., LTD., New Taipei (TW)

( * ) Notice: Subject to any disclaimer, the term of this patent is extended or adjusted under 35 U.S.C. 154(b) by 6 days.

(21) Appl. No.: 17/488,624

(22) Filed: Sep. 29, 2021

(65) Prior Publication Data

US 2022/0115812 A1    Apr. 14, 2022

(30) Foreign Application Priority Data

Oct. 8, 2020    (TW) ................................. 109213258

(51) Int. Cl.
*H01R 13/635* (2006.01)
*H01R 12/71* (2011.01)
(Continued)

(52) U.S. Cl.
CPC ......... *H01R 13/635* (2013.01); *G06K 7/0056* (2013.01); *G06K 13/0856* (2013.01);
(Continued)

(58) Field of Classification Search
CPC ........................... H01R 13/635; H01R 12/716; H01R 13/6581; H01R 12/71; H01R 12/712; H01R 13/62; H01R 13/629; G06K 7/0056; G06K 13/0856; G06K 7/0013; G06K 7/0021; G06K 13/08; G06K 13/0806; G06K 13/0812; G06K 13/0818; G06K 13/0831; G06K 13/085
See application file for complete search history.

(56) References Cited

U.S. PATENT DOCUMENTS

2013/0237097 A1* 9/2013 Nakamura ........... G06K 7/0056
439/633

FOREIGN PATENT DOCUMENTS

CN        107425315 A  * 12/2017  ........... H01R 12/714

* cited by examiner

*Primary Examiner* — Abdullah A Riyami
*Assistant Examiner* — Justin M Kratt
(74) *Attorney, Agent, or Firm* — MUNCY, GEISSLER, OLDS & LOWE, P.C.

(57) ABSTRACT

In a card connector, a main body has a plugging space formed therein and used to locate terminals of a terminal set, two sliding members of a sliding mechanism are movably disposed on two sides of the terminal set in the plugging space, respectively, and each sliding member has a supporting part protruded on a side thereof and extended into the plugging space, and elastic members are abutted between sides of the two sliding members and two opposite sidewalls of the plugging space, respectively; a terminal of a guiding rod is slid along a guiding groove, and an other terminal of the guiding rod is inserted through the main body; a push plate of a shielding housing is abutted with the guiding rod, so that a preset electronic card can be stably inserted into or ejected out of the plugging space through the two sliding members.

7 Claims, 8 Drawing Sheets

(51) Int. Cl.
  *H01R 13/6581* (2011.01)
  *G06K 7/00* (2006.01)
  *G06K 13/08* (2006.01)
  *H01R 13/62* (2006.01)
  *H01R 13/629* (2006.01)
(52) U.S. Cl.
  CPC ....... *H01R 12/716* (2013.01); *H01R 13/6581* (2013.01); *G06K 7/0013* (2013.01); *G06K 7/0021* (2013.01); *G06K 13/08* (2013.01); *G06K 13/085* (2013.01); *G06K 13/0806* (2013.01); *G06K 13/0812* (2013.01); *G06K 13/0818* (2013.01); *G06K 13/0831* (2013.01); *H01R 12/71* (2013.01); *H01R 12/712* (2013.01); *H01R 13/62* (2013.01); *H01R 13/629* (2013.01)

CARD CONNECTOR HAVING TWO SLIDING MEMBERS

CROSS-REFERENCE TO RELATED APPLICATIONS

This application claims the priority benefit of Taiwan patent application number 109213258, filed on Oct. 8, 2020, the entire contents of all of which are hereby incorporated by reference.

BACKGROUND OF THE INVENTION

1. Field of the Invention

The present invention provide a card connector, more particularly to a card connector which allows a preset electronic card to stably insert or eject, and two sliding members of a sliding mechanism are movably disposed on two sides of a terminal set in the plugging space of the main body of the card connector, respectively, so that the preset electronic card can be inserted into or ejected out of the plugging space by abutting with the two sliding members, to achieve the objective of smoothly inserting and ejecting the preset electronic card.

2. Description of the Related Art

Today's mobile phones, digital cameras, notebook computers, personal digital assistants and other electronic products are becoming more and more powerful, and also have increasing requirements for data storage; on the other hand, they are all developing in the direction of light, thin, short and small. The memory card connector is generally directly mounted on the circuit board and configured for insertion of various memory cards and electronic cards, so that the data in the electronic card can be transmitted through the electrical connection formed between the memory card connector and the circuit board. Because the memory card, the electronic card and the card connector are getting smaller and smaller, when the electronic card is inserted into the card connector, the electronic card is easy to deviate and skew because of the improper direction of force or improper operation, and it may cause collision or push between the electronic card and the terminal set in the card connector, and then cause skew or twist of the terminal set in the card connector, or scratch or abrasion on the contacts of the electronic card, as a result, the electronic card may be difficult to eject out of the card connector or the electrical connection between the electronic card and the circuit board becomes unstable. Therefore, when the electronic card is being inserted, it is very important to maintain the balance stability, reliable locating, and correct and good contact with the electronic card and contacts, and a stable connection to prevent the electronic card from loosening. However, the conventional card connector has not paid attention to the above-mentioned problems and related solutions.

SUMMARY OF THE INVENTION

An objective of the present invention is that a main body of a card connector has a plugging space formed therein and used to locate terminals of a terminal set, and a side (connection part) of each terminal is extended into the plugging space and other side (solder part) of the each terminal is extended to the outsides of the main body; two sliding members of a sliding mechanism are movably disposed on two sides of the terminal set in the plugging space, respectively, and each of the two sliding members has a supporting part protruded on a side thereof and extended into the plugging space; elastic members are abutted between sides of the two sliding members and two opposite sidewalls of the plugging space, respectively, and one of the two sliding members has a circulating guide groove formed on other side thereof, so that a terminal of a guiding rod can be moved and slid along the guiding groove; other terminal of the guiding rod is inserted on the main body; the main body, the terminal set and the sliding mechanism are covered by a shielding housing, a push plate of the shielding housing is abutted with the guiding rod, so that a preset electronic card can be stably inserted into or ejected out of the plugging space through the two sliding members, thereby achieving the objective of stably inserting and ejecting card.

Another objective of the present invention is that the plugging space of the main body has a plurality of through holes formed therein, the plurality of terminals of the terminal set are inserted into the plurality of through holes in a suspending state, a connection part of the each terminal is exposed above the through hole in the plugging space; sliding channels are formed on two sides of the terminal set in the plugging space, respectively, and each of the sliding channels includes a locating pin protruded on a side wall thereof and configured to insert and restrain a side of one of the elastic members, and the main body includes a restraining hole formed on other side thereof opposite to one of the locating pins in the sliding channels and configured for insertion of the other side of the guiding rod, and the main body includes restraining pins protruded on sides of the sliding members of the sliding mechanism and configured to insert and restrain other sides of the elastic members, respectively.

Another objective of the present invention is that the main body includes sliding channels formed on two sides of the plugging space, respectively, and two sliding members of the sliding mechanism are movably slidably placed into the sliding channels, respectively; partition members are disposed between the sliding channels and two sides of the plugging space to form isolation, respectively, and a channel is formed on a side of each partition members and in communication with the plugging space; locating pins are inwardly protruded on sidewalls of two sliding channels adjacent to the channels and configured to insert and restrain sides of the elastic members, respectively; the main body has a restraining hole formed on other side thereof opposite to one of the locating pins in the sliding channels and configured for insertion of the other side of the guiding rod; each of the sliding members of the sliding mechanism comprises a supporting part disposed on a side thereof, and each supporting part is protruded out of the channel on a side of the sliding channel and extended into the plugging space, respectively; each sliding member includes a restraining pin protruded on other side thereof opposite to the supporting part and configured to insert and restrain the other side of the elastic member, respectively.

Another objective of the present invention is that the shielding housing includes constraint arms disposed on a side thereof adjacent to the push plate and an opposite side thereof and downwardly protruded into the plugging space of the main body, the plugging space of the main body is configured for movable and slidable insertion of a preset electronic card or a card holder, and at least one engaging groove can be formed on each of two sides of the preset electronic card or the card holder, so that the constraint arms on two sides of the shielding housing can be engaged in the engaging grooves to form abutting and restraining status, respectively, thereby achieving the effect of assisting the preset electronic card or the card holder to more stably locate inside the plugging space of the main body without being easy to sway or laterally move.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
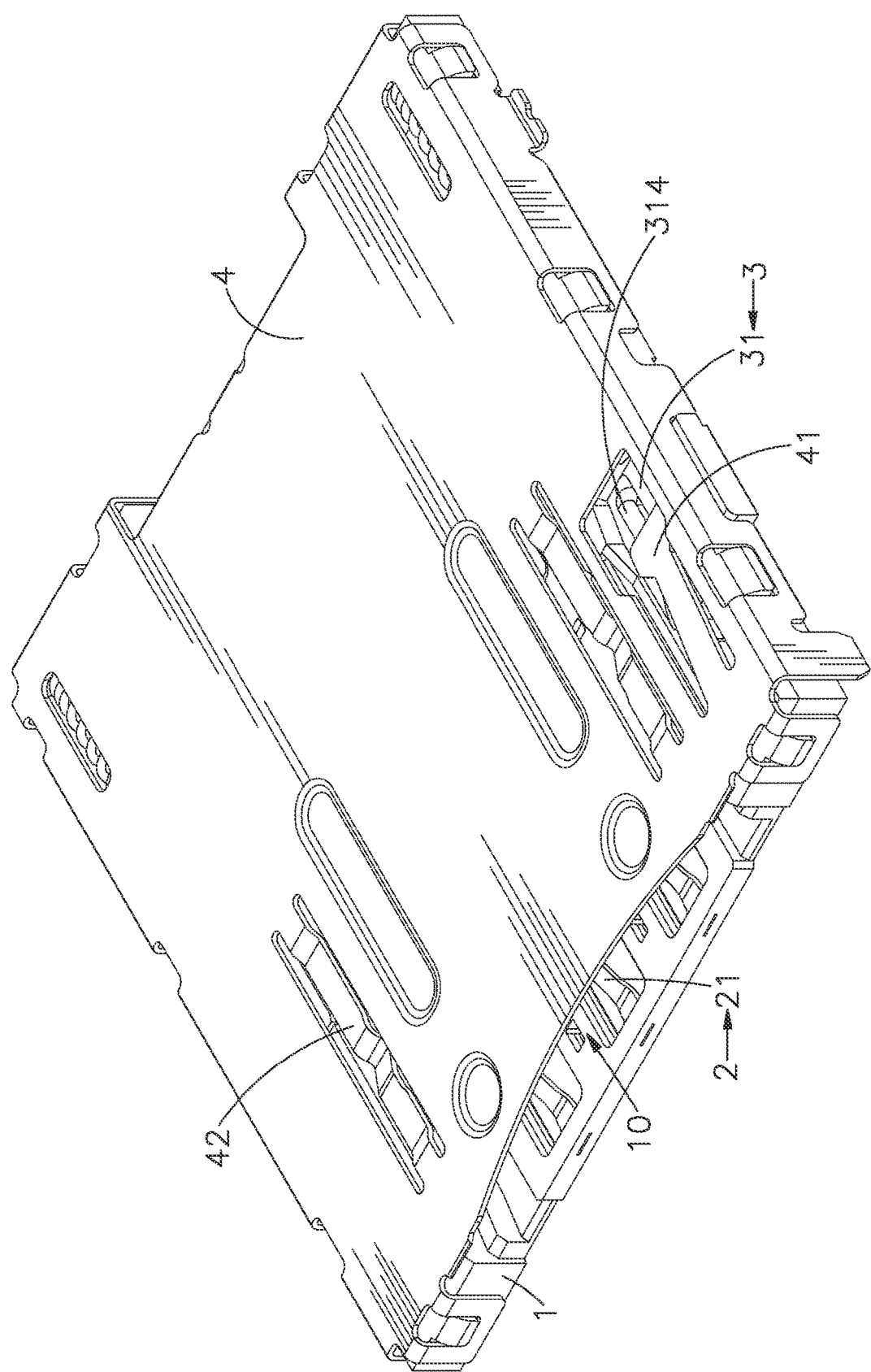
FIG. 1 is a perspective view of a card connector of the present invention.
Figure 2:
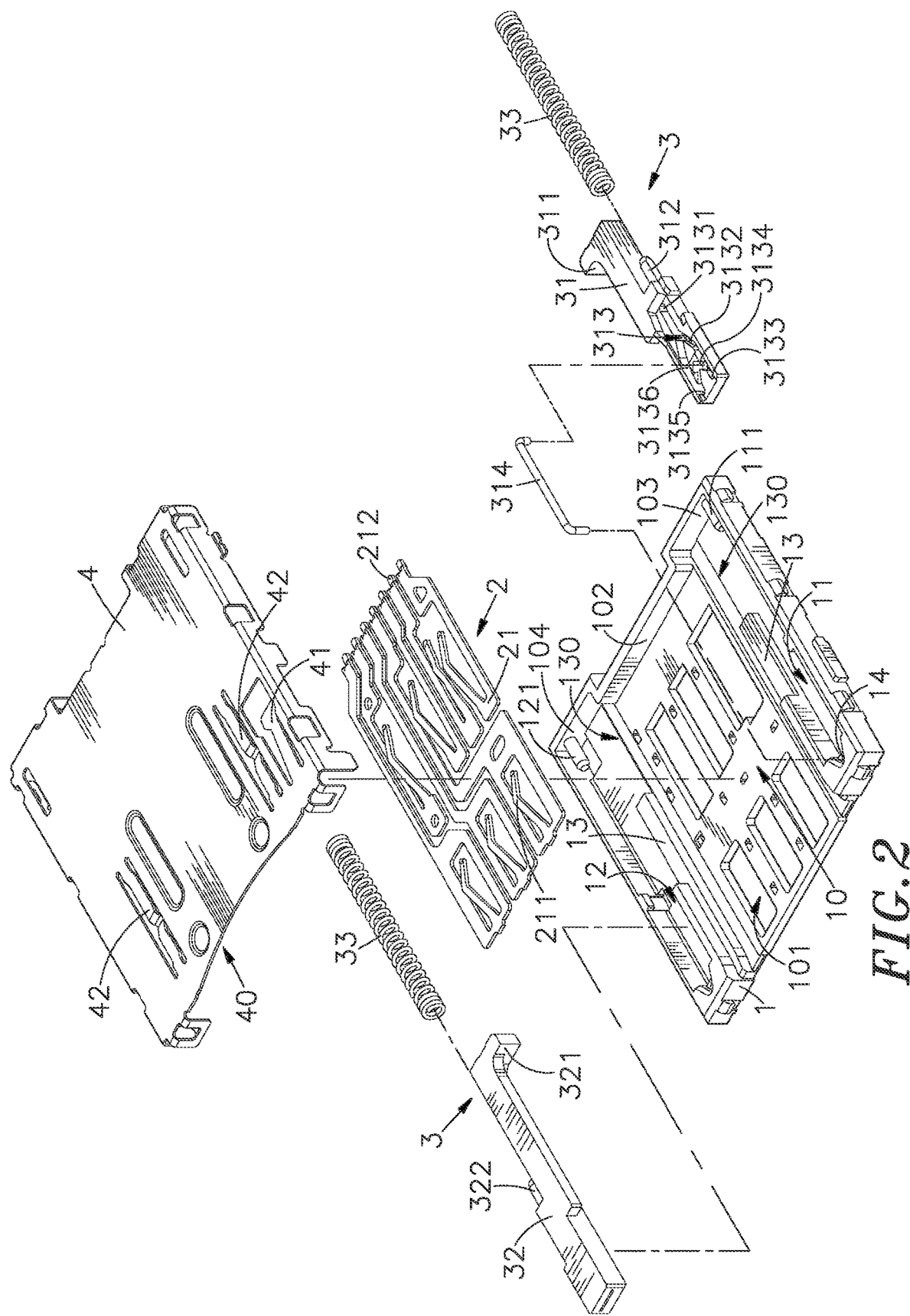
FIG. 2 is a perspective exploded view of a card connector of the present invention.
Figure 3:
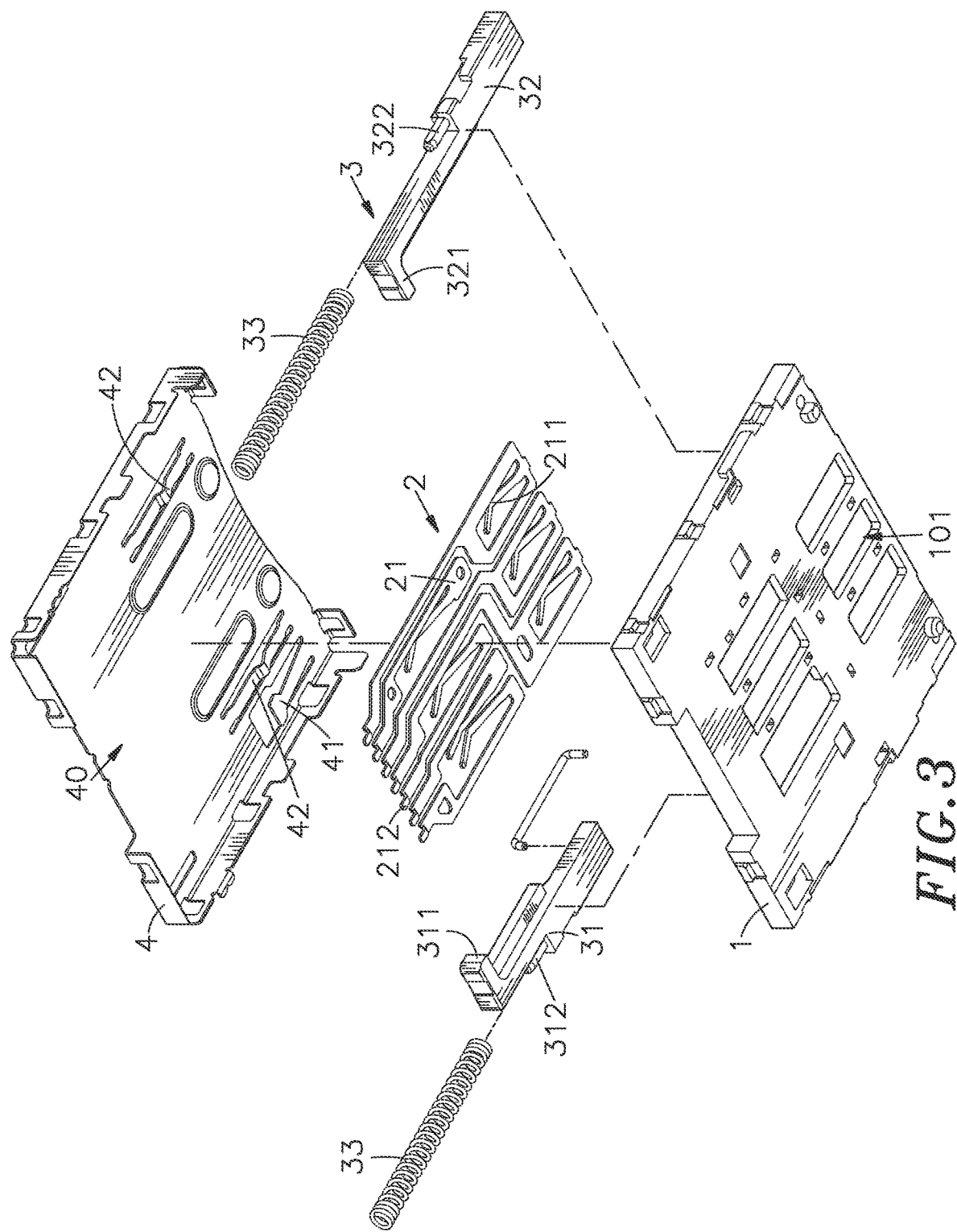
FIG. 3 is a perspective exploded view of a card connector of the present invention, when viewed from another angle.
Figure 4:
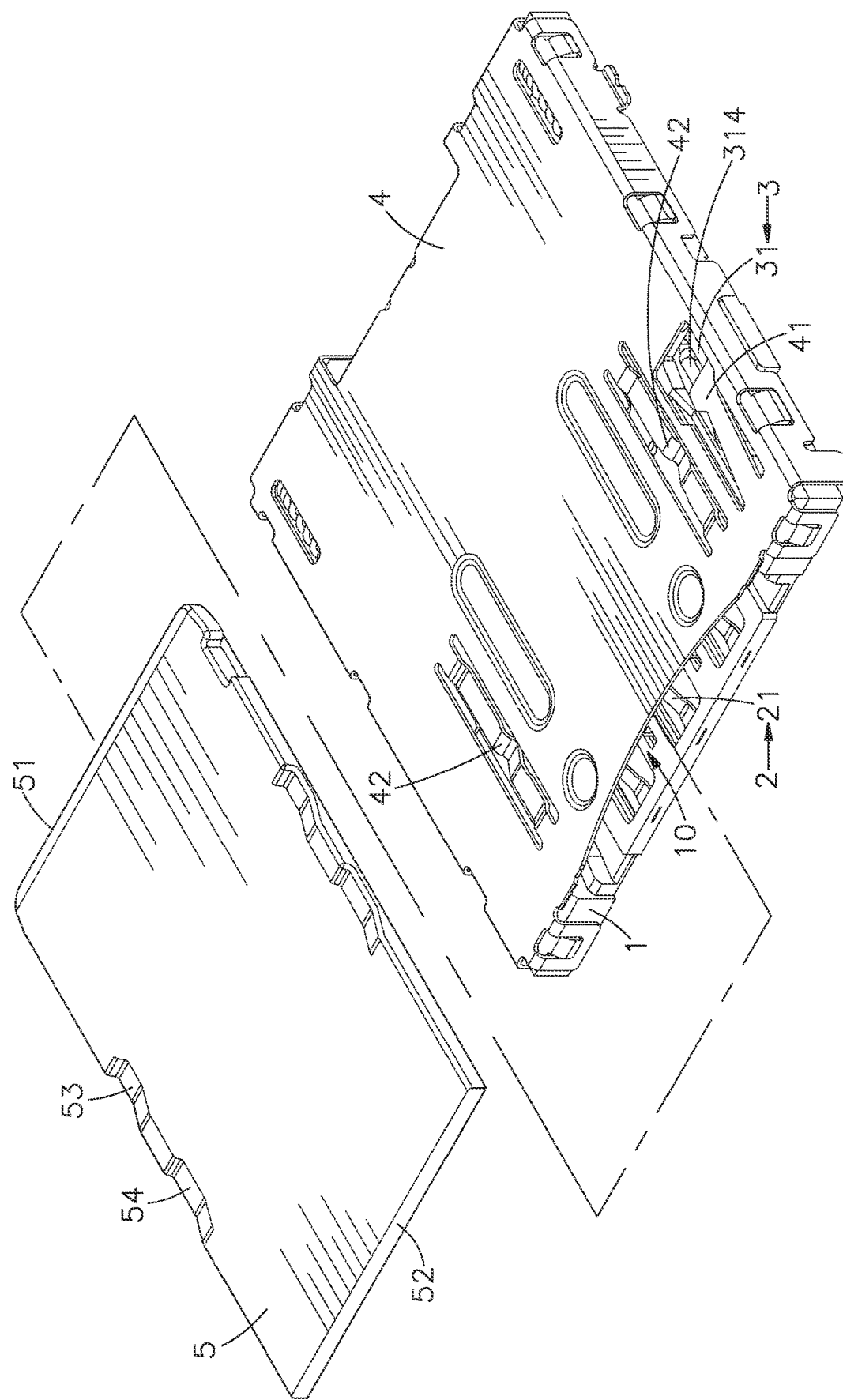
FIG. 4 is a perspective exploded view of a card connector, according to a preferred embodiment of the present invention.
Figure 5:
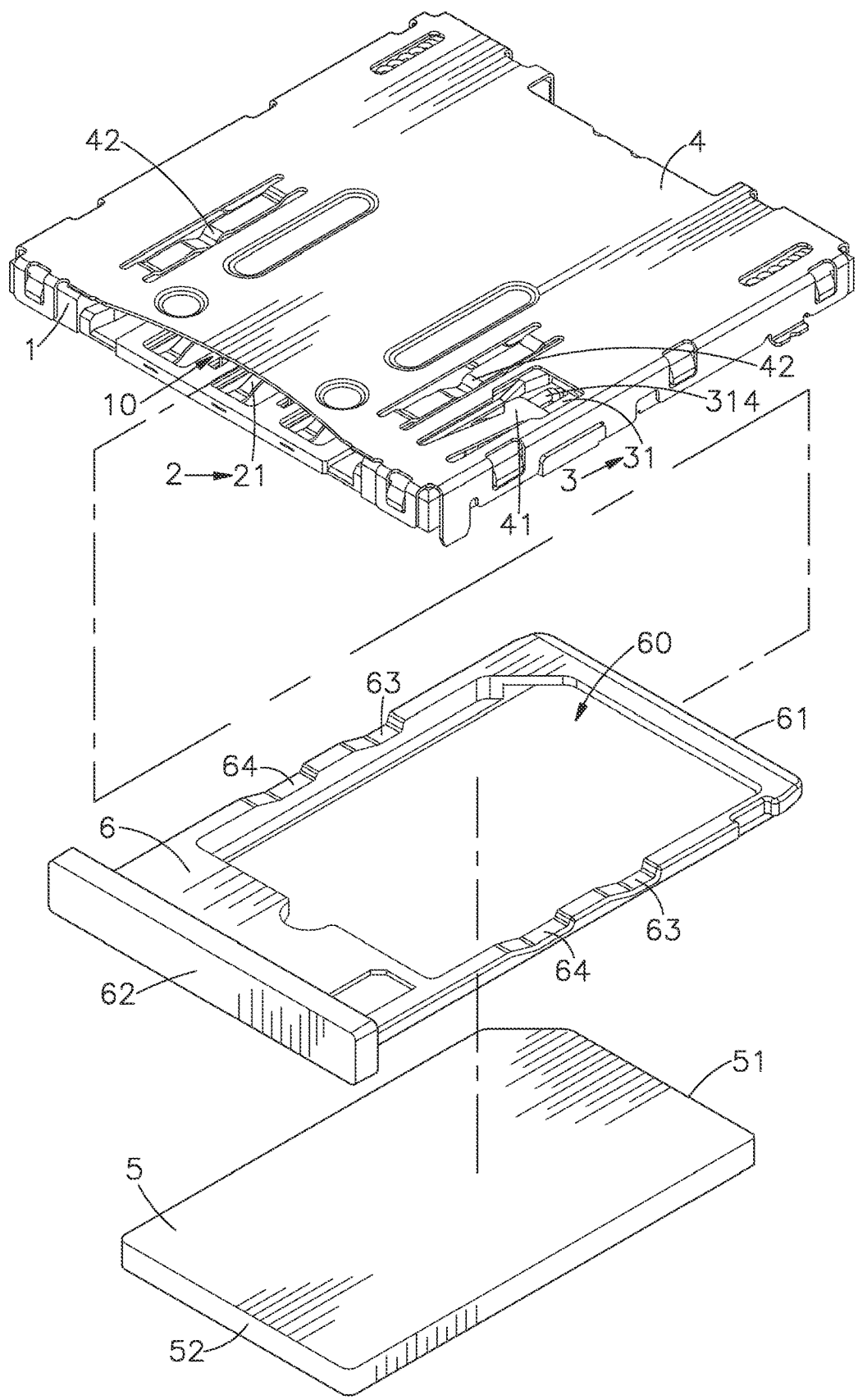
FIG. 5 is a perspective exploded view of a card connector, according to another embodiment of the present invention.
Figure 6:
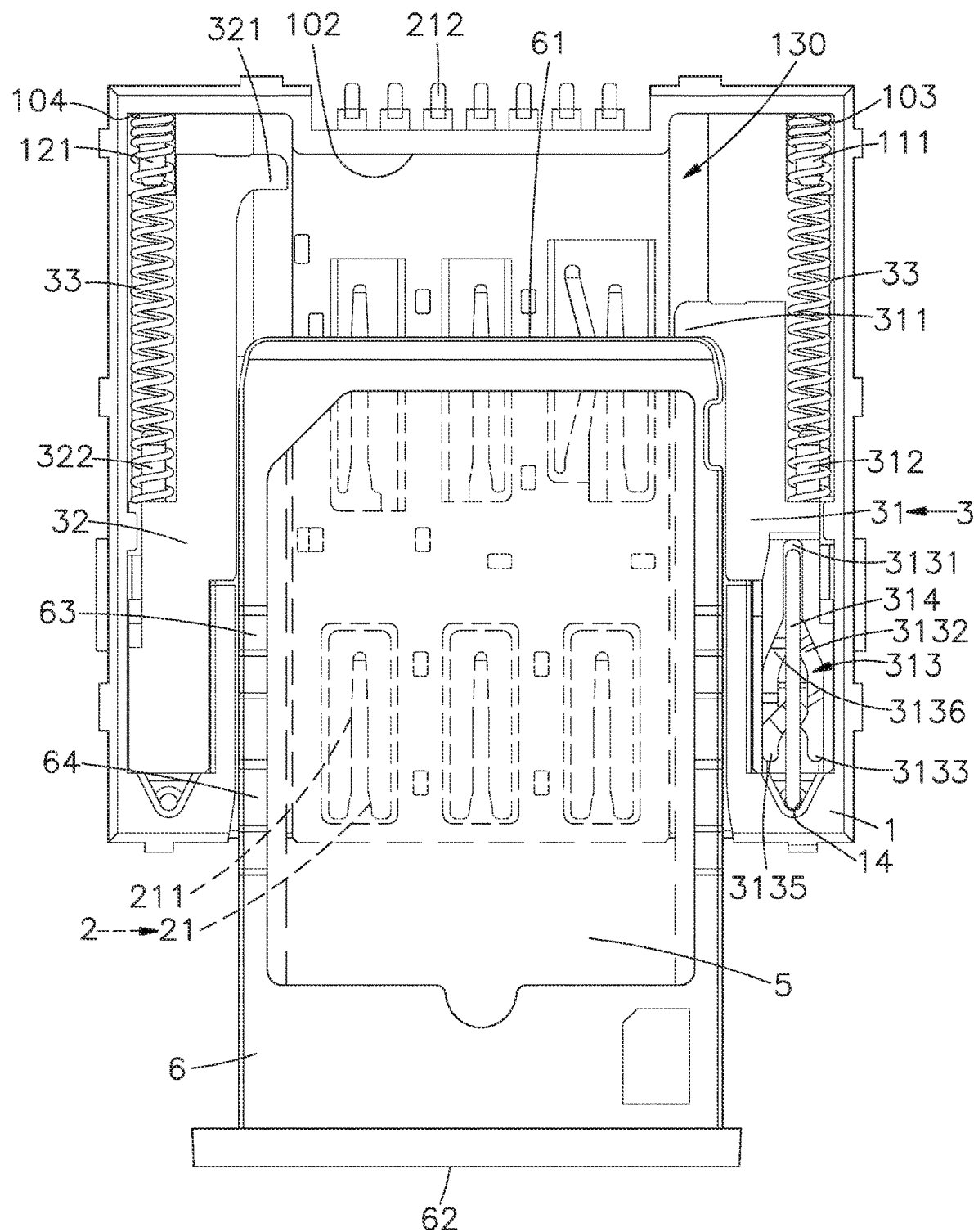
FIG. 6 is a top view of a card connector before card insertion, according to another embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 5. As shown in FIGS. 1 to 5, the card connector of the present invention includes a main body 1, a terminal set 2, a sliding mechanism 3 and a shielding housing 4.

The main body 1 includes a plugging space 10 formed therein, and the plugging space 10 includes through holes 101 formed on a bottom thereof, and the main body 1 includes a first sliding channel 11 and a second sliding channel 12 formed on two opposite sides of the through holes 101 of the plugging space 10, respectively; and the main body 1 includes partition members 13 protruded between the two sides of the plugging space 10 and the first sliding channel 11 and the second sliding channel 12, respectively, and the first sliding channel 11 and the second sliding channel 12 are disposed on opposite outer sides of the partition members 13, respectively, so as to form isolation between the plugging space 10, and the first sliding channel 11 and the second sliding channel 12. Each of the two partition members 13 has a channel 130 disposed on a side thereof and in communication with the plugging space 10. The plugging space 10 includes an inner sidewall 102 disposed on inner edge thereof and between the two channels 130. The first sliding channel 11 and the second sliding channel 12 include a first locating pin 111 and a second locating pin 121 protruded on side walls 103, 104 thereof adjacent to the two channels 130, respectively, and the main body 1 includes a restraining hole 14 formed on other side thereof opposite to the first locating pin 111 in the first sliding channel 11.

The terminal set 2 includes a plurality of terminals 21, each terminal 21 has a connection part 211 disposed on a side thereof, and a solder part 212 disposed on other side thereof, respectively.

The sliding mechanism 3 includes a first sliding member 31 and a second sliding member 32 opposite to each other, the first sliding member 31 includes a first supporting part 311 laterally protruded on a side thereof, the second sliding member 32 includes a second supporting part 321 laterally protruded on a side thereof; the first sliding member 31 includes a first restraining pin 312 protruded on other side thereof adjacent to the first supporting part 311, and the second sliding member 32 includes a second restraining pin 322 protruded on other side thereof adjacent to the second supporting part 321, and each of the first restraining pin 312 and the second restraining pin 322 are configured to insert into and restrain a side of an elastic member 33. The first sliding member 31 includes a circulating heart-shaped guiding groove 313, and a terminal of a guiding rod 314 is movably engaged in the guiding groove 313 to cyclically slide along the guiding groove 313.

The shielding housing 4 includes an accommodation space 40 recessed therein, a hanging-arm-type push plate 41 disposed on a side surface thereof and extended toward the accommodation space 40, and constraint arms 42 protruded on a side thereof adjacent to the push plate 41 and the opposite side thereof, and protruded toward the accommodation space 40, respectively.

When the above-mentioned members are assembled to form the card connector, the terminals 21 of the terminal set 2 are disposed inside the plugging space 10 of the main body 1 to locate the terminals 21 in the through holes 101, respectively, and the connection parts 211 of the terminals 21 are protruded into the plugging space 10, and the solder parts 212 on other sides of the terminals 21 are extended out of the main body 1. The first sliding member 31 and the second sliding member 32 of the sliding mechanism 3 are movably disposed in the first sliding channel 11 and the second sliding channel 12 on two sides of the plugging space 10, and the first supporting part 311 and the second supporting part 321 on the sides of the first sliding member 31 and the second sliding member 32 are extended into the plugging space 10 through the channels 130 on sides of the partition members 13, other sides of the elastic members 33 abutted with the first restraining pin 312 of the first sliding member 31 and the second restraining pin 322 of the second sliding member 32 are inserted into the first locating pin 111 of the first sliding channel 11 and abutted with the side wall 103 and the second locating pin 121 of the second sliding channel 12 and abutted with the side wall 104, respectively, to form restraining status. The other side of the guiding rod 314, which is movably engaged in the guiding groove 313 on the first sliding member 31, is inserted into the restraining hole 14 of the main body 1, so that the guiding rod 314 disposed on the restraining hole 14 can be swung in an appropriate range. The main body 1, the terminal set 2 and the sliding mechanism 3 are covered by the shielding housing 4, so that the shielding housing 4 is combined on the main body 1, the push plate 41 of the shielding housing 4 is abutted with the guiding rod 314 of the sliding mechanism 3, to restrain the guiding rod 314 from separating from the restraining hole 14 and the guiding groove 313. As a result, the main body 1, the terminal set 2, the sliding mechanism 3 and the shielding housing 4 can be assembled to form the card connector of the present invention.

Preferably, the terminals 21 of the terminal set 2 can be located in the above-mentioned main body 1 by an injection molding process; however, in an actual application, the terminals 21 of the terminal set 2 can be located in the main body 1 by an assembling manner. It should be noted that there are various manners of combining the terminals 21 of the terminal set 2 in the main body 1, so various equivalent structural changes, alternation or modifications based on the descriptions and figures of present invention are all consequently viewed as being embraced by the spirit and the scope of the present invention set forth in the claims.

Furthermore, a preset electronic card 5 can be inserted or ejected out of the plugging space 10 of the main body 1; in an embodiment, the preset electronic card 5 can be a memory stacking card, secure digital card, multimedia card, smart media card, extreme digital image memory card, and a series of cards or memory cards produced based on the above-mentioned memory card with improved design, such as, mini digital secure digital card, mini secure digital card or identification card. The smaller preset electronic card 5 can be mounted into an assembly space 60 of a card holder 6, and the card holder 6 combined with the preset electronic card 5 can be movably inserted into or ejected out of the plugging space 10 of the main body 1.

The first sliding member 31 and the second sliding member 32 of the sliding mechanism 3 are designed with different lengths, the first sliding member 31 includes the inverted-L-shaped first supporting part 311 disposed on a side thereof, and the second sliding member 32 includes the second supporting part 321 disposed on a side thereof, and the first supporting part 311 and the second supporting part 321 have different lengths, and the first sliding member 31 having the circulating guiding groove 313 has a length shorter than a length of the second sliding member 32.

Please refer to FIGS. 2, 3, 5 to 8. As shown in FIGS. 2, 3, 5 to 8, in actual application of the card connector of the present invention, the preset electronic card 5 can be movably inserted into or ejected out of the plugging space 10 between the partition members 13 on two sides of the main body 1; alternatively, the card holder 6 can be combined with the preset electronic card 5, and the card holder 6 can be inserted into or ejected out of the plugging space 10. When the preset electronic card 5 or the card holder 6 are inserted into the plugging space 10, two sides of a top edge 51 of the preset electronic card 5 or a top edge 61 of the card holder 6 can be abutted with an inner edges of the first supporting part 311 of the first sliding member 31 and the second supporting part 321 of the second sliding member 32 of the sliding mechanism 3, respectively, a user can apply force on an outer side edge 52 of the electronic card 5 or an outer side 62 of the card holder 6 to push, and when the preset electronic card 5 or the card holder 6 is inwardly pushed or outwardly ejected, the two sides of the top edge 51 of the preset electronic card 5 or the two sides of the top edge 61 of the card holder 6 can be held by the first supporting part 311 of the first sliding member 31 and the second supporting part 321 of the second sliding member 32 in balance, respectively, so that the first sliding member 31 and the second sliding member 32 are pushed to slide and moved along the first sliding channel 11 and the second sliding channel 12 on relative outer sides of the partition members 13 on two sides of the plugging space 10 of the main body 1, respectively; the constraint arms 42 on two sides of the shielding housing 4 can be engaged with a first engaging groove 53 and a second engaging groove 54 of the preset electronic card 5, or a first engaging groove 63 and a second engaging groove 64 on two sides of the card holder 6, respectively, so that the preset electronic card 5 or the card holder 6 can be stably slid and located in the plugging space 10 of the main body 1, thereby performing the operation of smoothly inserting or ejecting card and preventing from deviation, skew, shake or lateral displacement.

Figure 7:
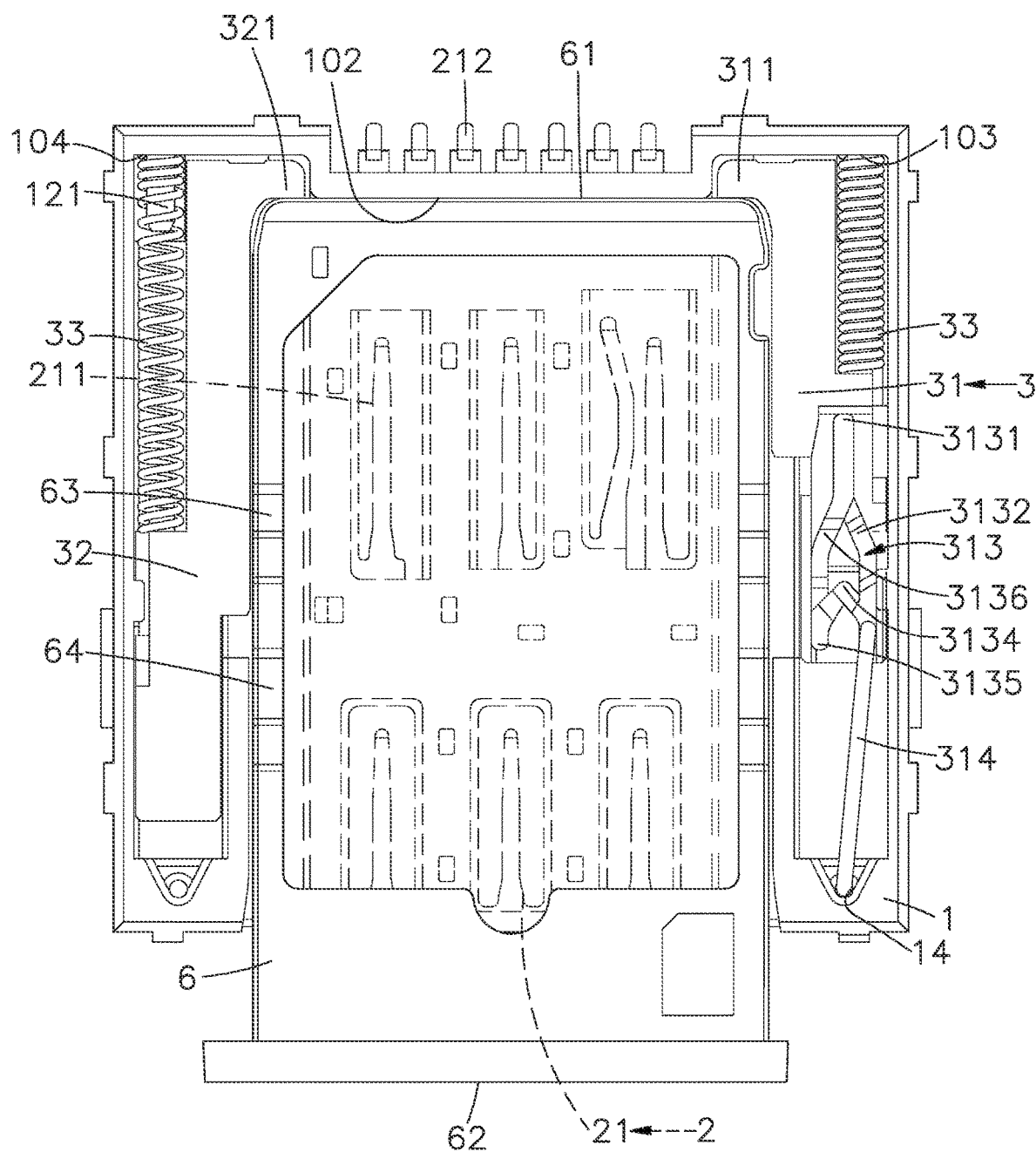
FIG. 7 is a top view of a card connector when a card is being inserted into the card connector, according to another embodiment of the present invention.
Figure 8:
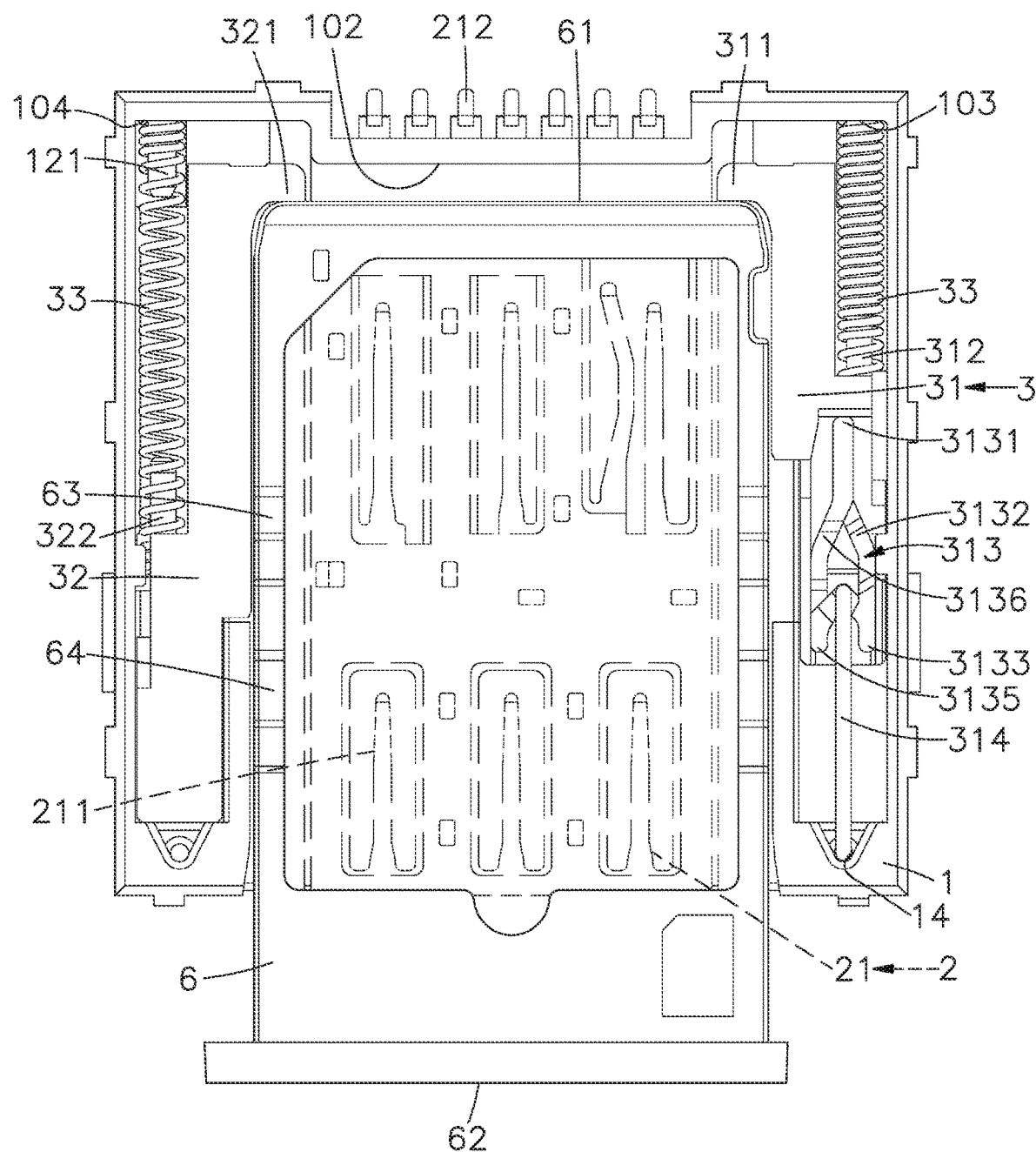
FIG. 8 is a top view of a card connector after a card is inserted into the card connector, according to another embodiment of the present invention.

When the preset electronic card 5 or the card holder 6 is inserted into the plugging space 10, a side of the top edge 51 of the preset electronic card 5 or the top edge 61 of the card holder 6 can be abutted with an inner edge of the first supporting part 311 of the first sliding member 31 of the sliding mechanism 3 first, and the user can apply force on the outer side edge 52 of the electronic card 5 or the outer side 62 of the card holder 6 to inwardly move, and make other side of the top edge 51 of the preset electronic card 5, and the top edge 61 of the card holder 6 abut with the second supporting part 321 of the second sliding member 32, so that the top edge 51 of the preset electronic card 5 or the top edge 61 of the card holder 6 can be abutted with the first supporting part 311 of the first sliding member 31 and the second supporting part 321 of the second sliding member 32 to slide along the channels 130 at the same time and also push the elastic members 33, and when the first sliding member 31 and the second sliding member 32 are pushed to slide and move in the first sliding channel 11 and the second sliding channel 12, and the first sliding member 31 is also driven to slide in the circulating guiding groove 313 in a heart-shaped track along the terminal of the guiding rod 314. After the top edge 51 of the preset electronic card 5 or the top edge 61 of the card holder 6 is abutted with an inner sidewall 102 of the plugging space 10, the guiding groove 313 of the first sliding member 31 is slid from a fastening section 3131 to a first sliding slot 3132 along the terminal of the guiding rod 314, to make a first guiding slot 3133 of the guiding groove 313 slide to a terminal of the guiding rod 314, as shown in FIG. 7. At this time, when the force applied on the outer side edge 52 of the preset electronic card 5 or the outer side 62 of the card holder 6 is released, elastic recovering forces of the two elastic members 33 push the first sliding member 31 and the second sliding member 32 to slide toward outsides of the main body 1, and the guiding groove 313 of the first sliding member 31 is slid along the terminal of the guiding rod 314 again to make a locating section 3134 fasten with the terminal of the guiding rod 314, as shown in FIG. 8, the preset electronic card 5 or the card holder 6 is slightly ejected out of the main body 1, an appropriate interval can be formed between the top edge 51 of the preset electronic card 5 or the top edge 61 of the card holder 6, and the inner sidewall 102 of the plugging space 10, so that the electronic card 5 or the card holder 6 is located inside the plugging space 10; at the same time, the first engaging grooves 53 on two sides of the preset electronic card 5 or the first engaging grooves 63 on two sides of the card holder 6 are pushed to move along the constraint arms 42 on two sides of the shielding housing 4 until the second engaging grooves 54 on two sides of the preset electronic card 5 or the second engaging grooves 64 on two sides of the card holder 6 are moved to engage and locate with the two constraint arms 42, so as to complete the insertion operation to place the electronic card 5 or the card holder 6 in the plugging space 10 of the main body 1.

In order to eject the preset electronic card 5 or the card holder 6 out of the plugging space 10 of the main body 1, the user just needs to apply force on the outer side edge 52 of the preset electronic card 5 or the outer side 62 of the card holder 6 to push the preset electronic card 5 or the card holder 6 toward the plugging space 10 of the main body 1, and then release the force applied on the outer side edge 52 of the preset electronic card 5 or the outer side 62 of the card holder 6, and the elastic recovering force of the two elastic members 33 can push the first sliding member 31 and the second sliding member 32 of the sliding mechanism 3, respectively, so that the first supporting part 311 of the first sliding member 31 and the second supporting part 321 of the second sliding member 32 are slid along the channels 130 on two sides of the plugging space 10, respectively, and drive the guiding groove 313 of the first sliding member 31 on a side of the plugging space 10 to move along the terminal of the guiding rod 314 again, a second guiding slot 3135 of the guiding groove 313 on other side of the plugging space 10 is moved to the terminal of the guiding rod 314, the guiding groove 313 of the first sliding member 31 is slid from the second guiding slot 3135 to a second sliding slot 3136 along the terminal of the guiding rod 314 until the fastening section 3131 of the guiding groove 313 is slid to the terminal of the guiding rod 314 again, so as to make the guiding groove 313 of the first sliding member 31 to repeatedly slide in the heart-shaped track along the terminal of the guiding rod 314, the fastening section 3131 of the guiding groove 313 is slid back to the terminal of the guiding rod 314; the two elastic members 33 push the first sliding member 31 and the second sliding member 32 at the same time, so that the preset electronic card 5 or the card holder 6 can be pushed out of the plugging space 10 of the main body 1; furthermore, the second engaging grooves 54 on two sides of the preset electronic card 5 or the second engaging grooves 64 on two sides of the card holder 6 are pushed to move along the constraint arms 42 on two sides of the shielding housing 4, the first engaging grooves 53 on two sides of the preset electronic card 5 or the first engaging grooves 63 on two sides of the card holder 6 are moved outwardly and back to the two constraint arms 42 to form the engaging and locating status, so as to complete the card ejection operation for the preset electronic card 5 or the card holder 6.

In actual application, the card connector of the present invention has the following advantages.

Firstly, the first sliding member 31 and the second sliding member 32 of the sliding mechanism 3 are movably disposed on the sliding channels 11 and 12 on two sides of the plugging space 10 of the main body 1, respectively, and the first supporting part 311 and the second supporting part 321 on a side of the first sliding member 31 and the second sliding member 32 are extended in the plugging space 10, respectively, two sides of the top edge 51 of the preset electronic card 5 or the top edge 61 of the card holder 6 are abutted with the first supporting part 311 and the second supporting part 321, respectively, when the preset electronic card 5 or the card holder 6 are slid and moved inside the plugging space 10, the preset electronic card 5 or the card holder 6 can be supported by the first supporting part 311 of the first sliding member 31 and the second supporting part 321 of the second sliding member 32 in balance, so as to make the preset electronic card 5 or the card holder 6 stably slide in the plugging space 10 without deviation or skew.

Secondly, the shielding housing 4 includes the constraint arms 42 disposed on two sides thereof, respectively, the preset electronic card 5 includes the first engaging grooves 53 formed on two sides thereof and the second engaging grooves 54 formed on two sides thereof, or the card holder 6 includes the first engaging grooves 63 formed on two sides thereof and the second engaging grooves 64 formed on two sides thereof to engage with the constraint arms 42 during sliding, so as to assist the preset electronic card 5 or the card holder 6 to more stably locate in the plugging space 10, not easy to sway or laterally move.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A card connector, comprising:
a main body comprising a plugging space formed therein;
a terminal set disposed in the plugging space of the main body, and comprising a plurality of terminals, wherein each of the plurality of terminals comprises a connection part disposed on a side thereof and extended into the plugging space, and a solder part disposed on an other side thereof opposite to the connection part and extended to outsides of the main body;
a sliding mechanism movably disposed in the plugging space of the main body and disposed on the two sides of the terminal set, wherein the sliding mechanism comprises two sliding members movably slidable along two sides of the plugging space, sides of the two sliding members are abutted with sides of elastic members, respectively, and the other sides of the elastic members are abutted with two side walls of the main body, respectively, and each of the two sliding members comprises a supporting part protruded on a side thereof and extended into the plugging space, one of the sliding members has a circulating guide groove formed on other side opposite to the supporting part, and a guiding rod disposed thereon and having a terminal movably slidably disposed inside the guide groove, and an other terminal of the guiding rod is inserted through the main body; and a shielding housing, wherein the main body and the sliding mechanism are covered by the shielding housing, and the shielding housing comprises a hanging-arm-type push plate disposed thereon, and a side of the hanging-arm-type push plate is abutted with the guiding rod, wherein the shielding housing comprises constraint arms disposed on a side thereof adjacent to the push plate and opposite side thereof and downwardly protruded into the plugging space of the main body, respectively, and the plugging space of the main body is configured for movable and slidable insertion of a preset electronic card or a card holder, and at least one engaging groove is formed on each of two sides of a preset electronic card or a card holder and configured to abut and restrain the constraint arms of the shielding housing.

2. The card connector according to claim 1, wherein the plugging space of the main body has a plurality of through holes formed therein, the plurality of terminals of the terminal set are inserted into the plurality of through holes in a suspending state, respectively, the connection part of each of the plurality of terminals is exposed above the through hole to be located inside the plugging space.

3. The card connector according to claim 1, wherein the main body comprises sliding channels formed on two sides of the terminal set in the plugging space, respectively, and each of the sliding channels comprises a locating pin protruded on one of the two side walls thereof and configured to insert into and restrain a side of one of the elastic members, and the main body comprises a restraining hole formed on an other side thereof opposite to one of the locating pins of the sliding channels and configured for insertion of the other side of the guiding rod, and each of the sliding members of the sliding mechanism comprises a restraining pin protruded on a side thereof configured to insert into and restrain other side of one of the elastic members.

4. The card connector according to claim 1, wherein the main body comprises sliding channels disposed on two sides thereof in the plugging space, respectively, the two sliding members of the sliding mechanism are movably slidably disposed in the sliding channels, respectively, and the main body comprises partition members disposed between the plugging space and the sliding channels on two sides thereof to form isolation, respectively, and a channel formed on a side of each of the partition members in communication with the plugging space, each of the sliding channels comprises a locating pin inwardly protruded on one of the two side walls thereof adjacent to the channel and configured to insert and restrain a side of each of the elastic members, and the main body has the restraining hole formed on other side thereof opposite to one of the locating pins of the sliding channels and configured for insertion of the other side of the guiding rod.

5. The card connector according to claim 4, wherein each of the sliding members of the sliding mechanism comprises a supporting part disposed on one side thereof and protruded out of the channel on a side of the sliding channel and extended into the plugging space, and each of the sliding members comprises a restraining pin protruded on an other side thereof opposite to the supporting part and configured to insert into and restrain the other side of each of the elastic members.

6. The card connector according to claim 1, wherein the two sliding members of the sliding mechanism have different lengths, and one of the sliding members having the circulating guide groove has a length shorter than a length of the other of the sliding members.

7. The card connector according to claim 6, wherein the supporting part is an inverted-L-shaped supporting part disposed on a side thereof, and lengths of the inverted-L-shaped supporting part of the sliding members are different from each other.

* * * * *